Patented Oct. 10, 1939

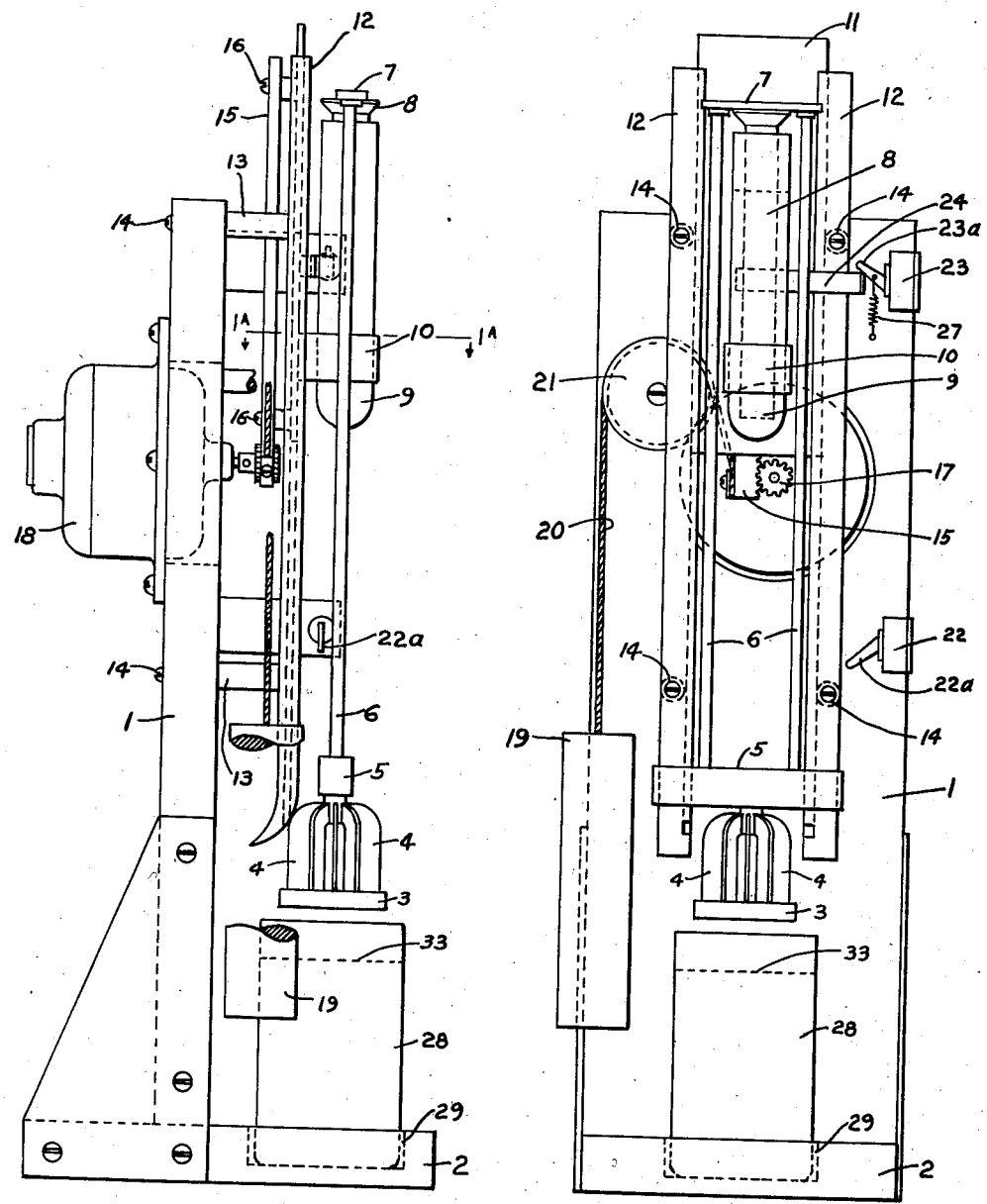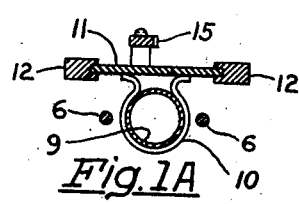

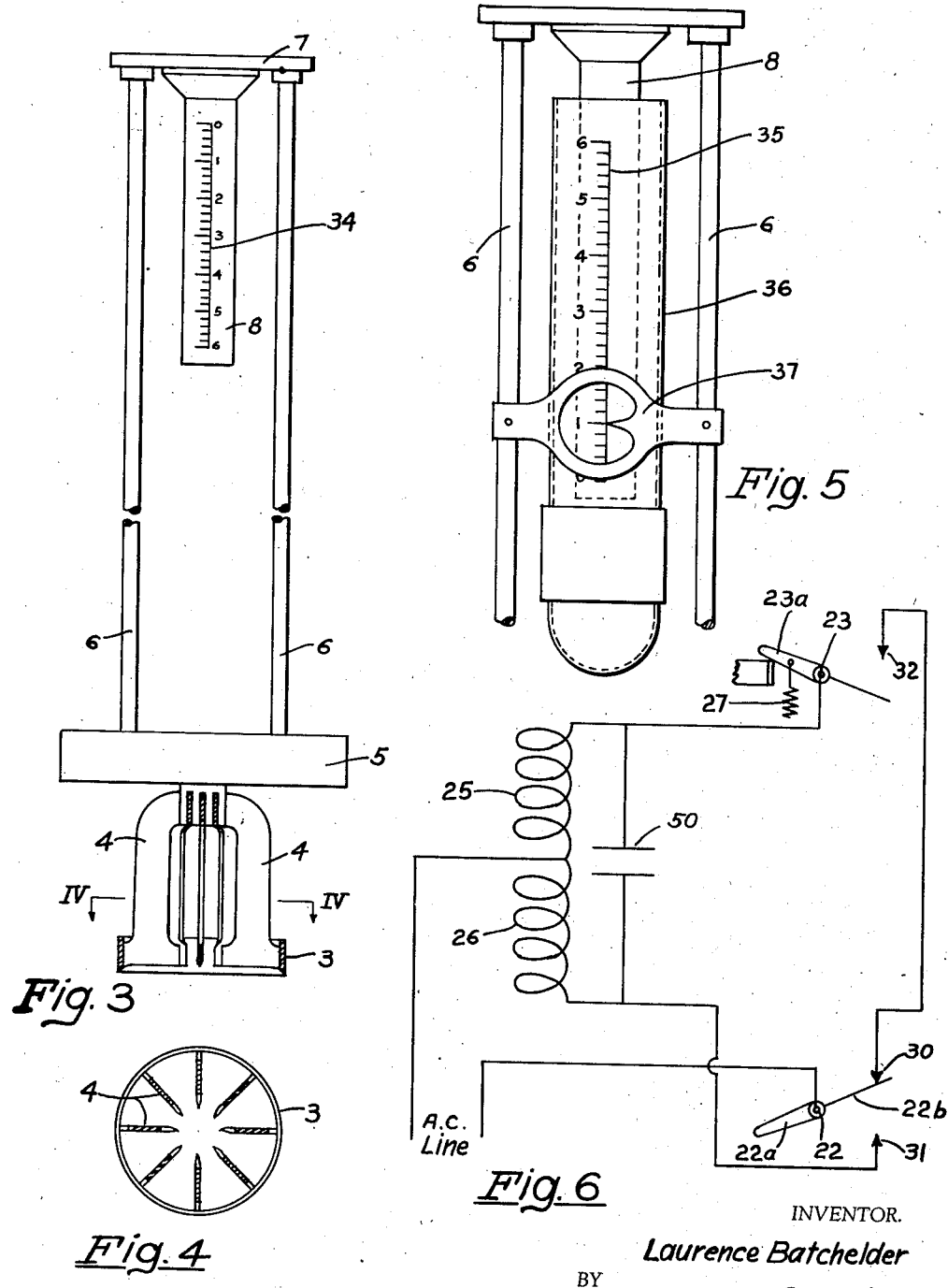

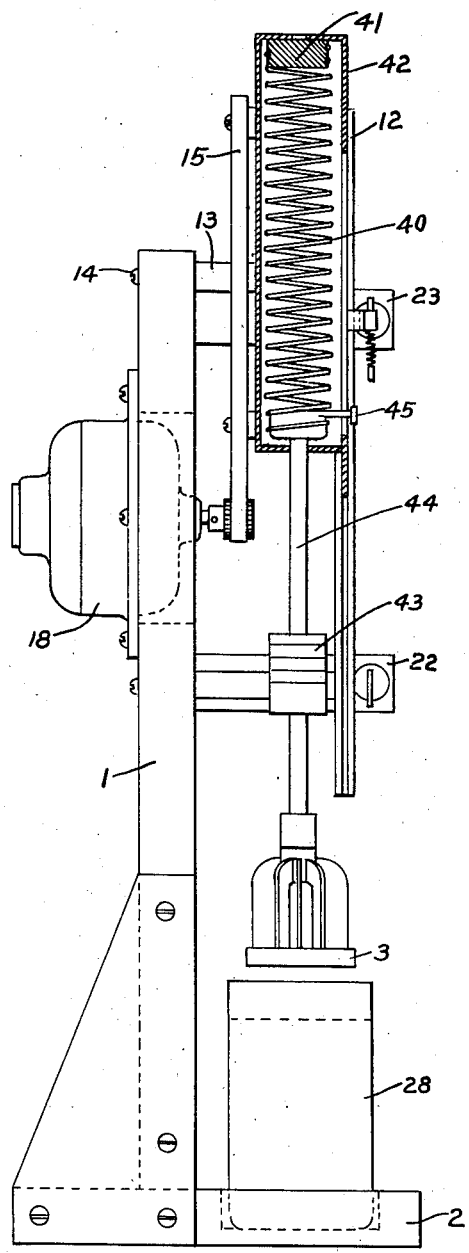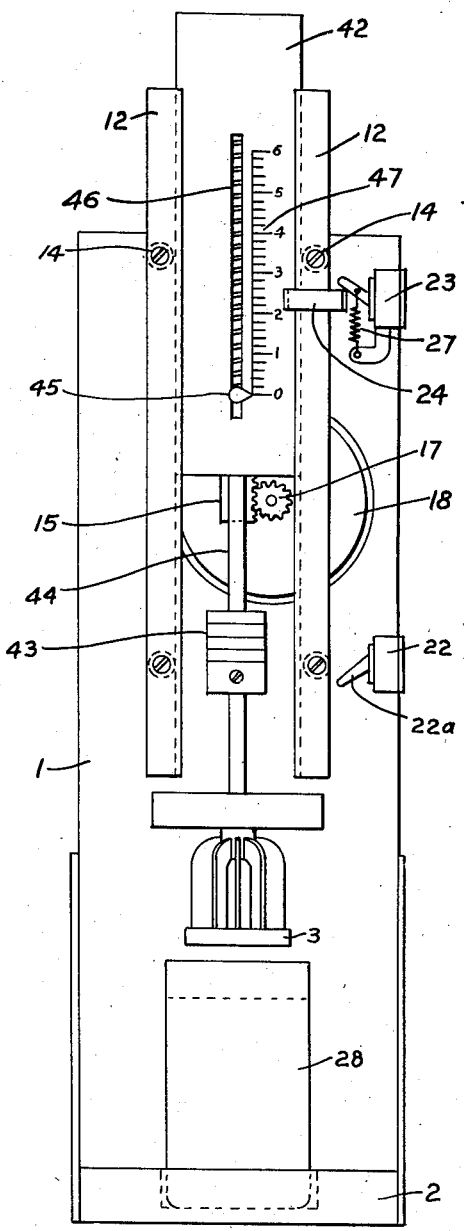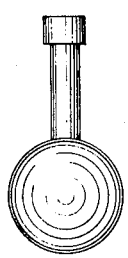

2,175,173

UNITED STATES PATENT OFFICE 2,175,173

APPARATUS FOR THE MEASUREMENT OF CURD TENSION

Laurence Batchelder, Cambridge, Mass., assignor to Submarine Signal Company, Boston, Mass., a corporation of Maine Application January 10, 1936, Serial No. 58,500

10 Claims. (Cl. 265—11)

The present invention relates to an apparatus for the measurement of the curd tension of milk.

When any milk is taken into the stomach, it is acted upon by the stomach's secretions which contain pepsin and hydrochloric acid. These substances substantially immediately bring about a coagulation or curdling of the milk in the stomach. Subsequent digestive processes must then deal with the curd which is so formed. The digestibility of milk depends on the toughness of the curd which is normally formed in the stomach. Some milk forms a curd which is very hard or tough. The curd formed by other milk may be quite soft and easily friable. It is, therefore, of interest to the dairyman to know the nature of the curd which is formed by a given batch of milk. For this purpose an arbitrary scale is used to classify different milks in terms of their curd tension.

A method for measuring the curd tension has been developed by R. L. Hill. This method comprises adding to a specified quantity of milk a certain amount of calcium chloride solution and pepsin. Upon being allowed to stand a short time, the milk so treated coagulates into a curd. The hardness or softness of the curd is then determined by measuring the force required to pull a knife of certain standard specifications through the curd. This force is generally measured in grams and is called the "curd tension".

In the Hill method the standard knife comprised a metal shank having a hook at one end and a series of radially arranged thin blades at the other end. The knife is set into a beaker into which the specified quantity of milk is poured and to which the calcium chloride and pepsin is then added. After the milk has coagulated in the beaker, the hook of the knife is engaged by a spring balance which is pulled upwardly by the operator who observes the reading on the spring balance while the knife moves upward during its travel through the curd. In carrying out this method of curd-tension measurement it is obviously necessary to have on hand as many knives as there are samples to be tested at a given time.

Other difficulties have also been observed. The curd often clots between the blades of the knife so that the upward pull on the knife causes a lump or clot of coagulated milk to rise with the knife, thereby giving an erroneous reading. It has also been found that in many instances the resistance of the curd to the passage of the knife through it is greater than the friction of the curd against the wall of the beaker. Consequently, in such a case the entire mass of curd rises with the knife, again producing a wholly erroneous reading on the spring balance. In addition to this, the rate at which the knife is raised through the curd as well as other factors depending upon the personal equation of the operator affect the accuracy of the measurements.

The present invention provides a curd-tension measuring apparatus which is free from the above mentioned disadvantages and which makes possible very rapid and accurate measurements even by an unskilled operator. According to the present invention the measuring knife is pushed down into the curd by an automatic motor-operated device. Furthermore, a synchronous motor is employed whereby the knife is given a constant downward speed, thus eliminating a variable factor which has heretofore been quite troublesome in making curd tension measurements.

The present invention will best be understood from the following description taken with reference to the accompanying drawings in which Fig. 1 illustrates a front elevation of my curd-tension measuring apparatus; Figure 1a is a sectional view of a portion of Figure 2 taken on a plane indicated by the line IA—IA; Figure 2 is a side elevation of the above; Figure 3 is a detail view of the knife-carrying element; Figure 4 is a cross section along the line IV—IV through the knife as shown in Figure 3; Figure 5 is a modification of the previous figures in so far as the scale arrangement is concerned; Figure 6 is a schematic wiring diagram of the circuit for controlling the motor in the apparatus; Figure 7 is a front elevation of a modification of Figure 1; Figure 8 is a side elevation of the device shown in Figure 7; and Figure 9 is a detailed view of a spherical element for use for viscosity measurements.

Referring to Figures 1 to 4, the apparatus is mounted on a frame having a vertical portion 1 secured to a base 2. The measuring knife 3 is composed of a ring-shaped member to which are secured a plurality of inwardly extending radial blades 4. The knife is fixed to an assembly comprising the bar 5, the rods 6 and the bar 7. Between the rods 6 and fixed to the bar 7 a cylindrical plunger 8 is mounted. The plunger 8 is immersed in a tube 9, preferably of glass, which is filled with mercury. Thus the entire weight of the knife and the assembly to which it is fixed is supported by the mercury in the tube 9.

The tube 9 is cemented in the ring member 10 (see Figure 1a) mounted on a plate 11 which is adapted to slide up and down in grooves in the vertical members 12 which are secured by means of spacers 13 and screws 14 to the vertical supporting member 1. The motion of the plate 11 is controlled by the rack 15 which is secured thereto by means of the screws 16 and the pinion gear 17 which meshes with the rack and which is fastened to the shaft of the motor 18 mounted on the vertical member 1. A reduction gear may be inserted between the motor shaft and the pinion to reduce the speed of the plate 11 if desired. A downward speed of about 15 inches per minute for the plate has been found satisfactory.

The weight of the moving elements is more or less balanced by the counter-weight 19 which is attached to the cord 20. The latter passes over the pulley 21 and is fixed to the rack 15.

The up-and-down motion of the plate 11 under the influence of the motor 18 is controlled and limited by means of the switches 22 and 23 which are positioned to be actuated by the arm 24 which is fastened to the plate 11.

The circuit connections of the switches and the motor are shown schematically in Figure 6. The motor 18 is a reversible synchronous motor having the two field windings 25 and 26 connected across the A. C. supply line, one winding being in series with a condenser 50, depending upon the position of the switches 22 and 23. The switch 23 is a single-pole, single-throw switch, whose switch arm is normally held in the closed position by the spring 27. The switch 22 is a single-pole, double-throw switch as will be seen in Figure 6.

The beaker 28 containing the coagulated milk to be tested is placed in a depression 29 in the base 2 beneath the knife 3 which is at its highest position. While in this position the arm 24 engages the switch lever 23a, thereby holding the switch 23 open. At the same time the lever 22a of the switch 22 is in its downward position so that the switch arm 22b makes connection with the contact 30. Under these conditions the motor circuit is open and the apparatus is at rest. When the operator is ready to make a measurement, he moves the switch lever 22a upwards so that the switch arm 22b makes connection with the contact 31.

The windings 25 and 26 of the motor 18 are thereby energized so that the current in winding 25 leads that in winding 26, causing the pinion 17 to be rotated in a counter-clockwise direction, as shown in Figure 1, thereby moving the rack 15 downwards as well as the plate 11 together with the mercury-filled tube 9 and the arm 24 which are mounted on the plate. Since the plunger 8 is immersed in the mercury in the tube 9, the whole knife assembly is freely floating on the mercury which supports it. As the tube 9 is lowered by the rotation of the motor 18, the knife 3 is also lowered until it comes in contact with the surface 33 of the coagulated milk under test in the beaker. The plate 11 and the tube 9 continue to descend at a constant speed while the knife 3 settles through the curd until the bar 5 rests on top of the beaker 28. Meanwhile, the switch 23 will have closed under the action of the spring 27.

As the motor continues to revolve, the plate 11 descends until the arm 24 strikes lever 22a, pushing it downwards so that the arm 22b again connects with contact 30 instead of with 31 whereby the connections to the field coils are reversed and the current in coil 26 is made to lead that in coil 25. This causes the motor to turn the pinion 17 in a clockwise direction, whereby the rack 15 and the elements supported thereby are moved upward. When the arm 24 again strikes switch lever 23a, the switch 23 is opened, thereby disconnecting the motor from the line and stopping the apparatus in condition for a second measurement.

It will be evident that when the knife 3 starts to penetrate the coagulated milk in the beaker 28, its downward motion is restricted by the resistance of the curd in the beaker. Hard curd will offer a greater resistance to the passage of the knife through it than soft curd. Since the knife assembly is supported entirely by the mercury in the tube 9, there will be substantially no force propelling the knife downward up to the instant it meets the surface 33 of the coagulated milk in the beaker. The resistance of the curd will prevent the plunger 8 from following the mercury downward at the same rate as before, and consequently the plunger 8 will rise with respect to the tube 9 and also with respect to the level of the mercury in the tube.

Since, in accordance with Archimedes principle, a body immersed in a liquid is buoyed up by a force equal to the weight of the liquid displaced, it will be evident that the weight of the knife assembly acting upon the coagulated milk in the beaker will continuously increase to the point where the knife passes at a substantially constant speed through the coagulated milk. The position of the plunger 8 with respect to the level of the mercury in the tube 9 thus offers a measure of the resistance of the curd to the passage of the knife through it and, consequently, of the curd tension. This measurement is conveniently made by a scale 34 affixed to the plunger.

Instead of reading the height of the plunger with respect to the level of the mercury in the tube 9, the height of the plunger may be read with respect to a scale engraved upon the tube itself, provided the amount of mercury in the tube is maintained constant. An arrangement of this kind is shown in Figure 5. Here the tube 36 is preferably made of metal, whereby breakage, which may occur with glass tubes, can be avoided. A scale 35 is engraved directly upon the metal tube 36. An index 37 is fixed to the members 6 to which the plunger 8 is attached. It will be evident that the nearer the index approaches the top of the tube 36 the greater is the resistance offered by the curd being tested to the passage of the knife and consequently, the greater is the curd tension.

It will be understood that the scales shown in the several figures are arbitrary and that they may be calibrated to read in grams or any other desired unit.

In the arrangements just described the apparent loss of weight of the curd-measuring knife produced by the resistance offered by the curd to the knife's passage through it is used as a measure of the curd tension. This is indicated by the decrease in the amount of mercury displaced by the plunger.

The indication of the resistance offered by the curd to the passage of the knife through it may also be made by the arrangement shown in Figures 7 and 8. Here the knife 3 is suspended directly from the lower end of a spring 40 whose upper end is fixed to the block 41 within the hemi-cylindrical casing 42 which is attached to the rack 15 operated by the motor 18 in a manner similar to that shown in Figure 1. Weights 43 attached to the rod 44 by which the knife is attached to the end of the spring are adjusted so that the weight of the latter elements is just sufficient to stretch the spring to the zero mark on the scale 47. The front flat face of the spring housing 42 is arranged to slide in grooves in the members 12 and takes the place of the plate 11 in Figure 1. An index 45 is fixed to the upper end of the rod 44 where the latter is joined to the spring 40. The index 45 projects through a slot 46 in the spring housing 42 in a manner similar to that of the ordinary spring balance. A scale 47 engraved on the plate 42 indicates the position of the index 45. The operation of this arrangement is similar to that already described with reference to Figure 1. When the switch 22a is moved upwards, the motor revolves and lowers the rack 15 together with the measuring knife 3. When the latter encounters the curd in the beaker, the pull of the knife on the spring 40 is reduced, causing the index 45 to rise along the scale 47. When the arm 24 strikes the switch lever 22a, the motor reverses and again raises the rack and the measuring knife to its starting position.

It will be observed that the present invention provides a curd-tension measuring instrument which is substantially entirely automatic and requires merely the operation of a switch to commence the test so that the operator is able to give his entire attention to reading the instrument. Furthermore, by the use of a synchronous motor in conjunction with the knife-lowering mechanism, the force with which the knife acts upon the curd whose tension is being measured increases always at the same rate to the point where the resistance offered by the curd is exactly equal to the lifting force upon the knife exerted by the mercury in one case or by the spring in the other modification. It is when this point of equilibrium is reached while the knife is still on its way downward through the curd that the reading of the instrument is to be observed. Inasmuch as with the present invention the operator has nothing to do at this time but to read the scale, he can obtain much more accurate results than were possible with the equipment heretofore used. Furthermore, only one knife is required for any desired number of successive measurements.

It will be understood that when speaking above of the resistance of the curd to the passage of the knife through it, I mean the resistance of the curd to being cut by the knife. The knife should of course be designed to reduce friction to a minimum for otherwise the measurement will be of viscosity rather than of curd tension.

On the other hand, should it be desired to measure the viscosity of a liquid or semi-solid substance, my apparatus may advantageously be employed by substituting for the knife an element having considerable surface, as for example, a ball such as shown in Figure 9.

Having now described my invention, I claim:

1. Apparatus for measuring the curd tension of milk comprising in combination with a curd-penetrating element, resilient means for supporting the same, means for lowering at a fixed constant speed the supporting means and means for indicating the effect upon said resilient means when said element penetrates the curd whose tension is being measured.

2. Apparatus for measuring the curd tension of milk including a curd-cutting knife, spring means for suspending the same, means for supporting said spring, means for lowering said supporting means at a constant speed and means for indicating the release of tension in said spring when said knife engages the curd whose tension is being measured.

3. Apparatus for measuring the curd tension of milk comprising in combination with a curd-penetrating knife, a supporting frame therefor, a liquid-filled container, means for floating said knife-supporting frame upon said liquid and means for indicating the immersion depth of said floating means.

4. Apparatus for measuring the curd tension of milk comprising in combination with a curd-penetrating knife, a supporting frame therefor, a mercury-filled container, means for floating said knife-supporting frame upon said mercury and means for indicating the surface level of said mercury with respect to said float.

5. Apparatus for measuring the curd tension of milk comprising a curd-penetrating element, a supporting structure therefor having a plunger, a liquid-filled cylinder adapted to receive said plunger, the specific gravity of said liquid and the dimensions of said plunger, cylinder and the weight of said element and supporting structure being such that the latter is normally supported by the plunger floating on the liquid, means for lowering said cylinder at a fixed speed and thereby lowering said element into the curd whose tension is being measured and means for indicating the amount of rise of said plunger out of the liquid when said element penetrates the curd.

6. Apparatus for measuring the curd tension of milk including a curd-cutting knife, supporting means therefor, motor-driven means for raising and lowering said supporting means, an operating circuit for said motor, switches in said motor circuit and means fixed to said supporting means adapted to operate one of said switches at the predetermined limit of travel in each direction.

7. A material testing device including an element adapted to penetrate said material under the action of the force of gravity, supporting means for said element, motor-driven means for raising and lowering said supporting means, an operating circuit for said motor, and means in said circuit operable by the motion of said supporting means for reversing and stopping said motor at a predetermined lower and upper limit of travel respectively.

8. A material testing device comprising an element having a definite weight and adapted to penetrate said material under the action of the force of gravity only, means for supporting said element including means adapted to yield in proportion to the effective weight of said penetrating element supported thereby, means positioning said material beneath said element, means for lowering said supporting means at a predetermined rate and thereby lowering said element into the material under test, whereby the apparent loss of weight of said penetrating element caused by the resistance of the material to the passage of the element through it decreases the amount of yield of said yielding means, and means for indicating the amount of yield of said yielding means.

9. A material testing device comprising an element having a definite weight and adapted to penetrate said material under the action of the force of gravity only, means for supporting said element including yielding means adapted to undergo deformation in proportion to that portion of the weight of said penetrating element which is supported thereby, means positioning the material under test beneath said element, means for lowering said supporting means at a predetermined rate and thereby lowering said element into the material under test, whereby the material, by its resistance to the passage of said element through it, supports a portion of the weight of the element, thereby decreasing the deformation of said yielding means, and means for indicating the difference between the deformation of the yielding means when supporting the entire weight of said element and the actual deformation of the yielding means.

10. Apparatus for measuring the viscosity of liquids and semi-solids comprising a liquid penetrating element having a relatively large horizontal cross-sectional area, means for supporting said element including means adapted to yield in proportion to the effective weight of said penetrating element supported thereby, means positioning the material under test beneath said element, means for lowering said supporting means at a predetermined rate and thereby tending to lower said element into the material under test whereby the apparent loss of weight of said penetrating element caused by the resistance of the material to the passage of the element through it decreases the amount of yield of said yielding means, and means for indicating the difference between the amount of yield of the yielding means when supporting the entire weight of said element and the actual amount of yield of the yielding means.

LAURENCE BATCHELDER.